United States Patent [19]

May, Jr. et al.

[11] 3,991,287

[45] Nov. 9, 1976

[54] DIGITAL ECHO SUPPRESSOR NOISE INSERTION

[75] Inventors: Carl Jerome May, Jr., Holmdel; Frank Louis Pento, Colts Neck, both of N.J.

[73] Assignee: Bell Telephone Laboratories, Incorporated, Murray Hill, N.J.

[22] Filed: Apr. 24, 1975

[21] Appl. No.: 571,055

[52] U.S. Cl. .................................................. 179/170.2
[51] Int. Cl.² ................................................... H04B 3/20
[58] Field of Search........... 179/170.2, 170.6, 170.8, 179/1.5 R; 178/22

[56] References Cited
UNITED STATES PATENTS

| | | | |
|---|---|---|---|
| 3,471,657 | 10/1969 | Holman et al. .................. | 179/170.6 |
| 3,673,355 | 6/1972 | La Marche et al. ............. | 179/170.6 |
| 3,699,273 | 10/1972 | Montgomery.................... | 179/170.2 |
| 3,823,275 | 7/1974 | La Marche et al. ............. | 179/170.2 |

Primary Examiner—Kathleen H. Claffy
Assistant Examiner—Randall P. Myers
Attorney, Agent, or Firm—Donnie E. Snedeker

[57] ABSTRACT

During echo suppression in a system utilizing a full echo suppressor, noise is typically inserted in the receive line of the near-end party to assure him that the line has not "gone dead". The need for a separate noise source for this purpose is eliminated in a digital system by using the existing coded incoming signals on the line. Thus, during echo suppression the bits of the coded incoming signal are altered to provide a random noise signal of normal background amplitude which is then inserted on the receive line. In an illustrative companded sign magnitude code embodiment, the sign bit is replaced by the least significant bit, the least and next-to-least significant bits are interchanged and the remaining bits are zeroed, thereby producing an unintelligible background noise signal of appropriate amplitude.

14 Claims, 3 Drawing Figures

| | | DATA OUT | | | | | | | |
|---|---|---|---|---|---|---|---|---|---|
| | | RR7 | RR6 | RR5 | RR4 | RR3 | RR2 | RR1 | RR0 |
| $\bar{N}$ | TRANSMIT | R7 | R6 | R5 | R4 | R3 | R2 | R1 | R0 |
| N | SUPPRESS (NOISE) | R0 | 0 | 0 | 0 | 0 | 0 | R0 | R1 |

3,991,287

DIGITAL ECHO SUPPRESSOR NOISE INSERTION

BACKGROUND OF THE INVENTION

This invention relates to noise insertion arrangements for digital speech transmission systems and, more particularly, to noise insertion arrangements for use in digital echo suppressors.

Noise insertion arrangements are useful in a variety of speech transmission systems in which the receive or incoming transmission path to a subscriber terminal is momentarily interrupted or disabled, such as for echo suppression purposes. The transmission facility typically contributes significantly to the overall background noise normally heard by the subscriber. Thus when the receive path is disabled by operation of an echo suppressor or other apparatus, a significant drop will occur in the noise level received by the subscriber, perhaps sufficient to cause him to believe that the transmission facility has failed or been disconnected. Ideally, the subscriber should be completely unaware of the operation of the echo suppressor or other apparatus. Toward this end, it is known to insert a noise signal on the path to the subscriber to substantially offset the drop in received noise level when the receive path is disabled. A limiter and frequency doubler arrangement for eliminating such noise fluctuations in an analog echo suppressor is disclosed, for example, in E. W. Holman-J. E. Unrue, Jr. U.S. Pat. No. 3,471,657 issued Oct. 7, 1969.

In digital transmission systems, the voice and other signals on the receive transmission path appear as digitally encoded words. Speech transmission over the receive path is typically disabled, such as for suppression of echoes, via connection of digital attenuator circuitry into the transmission path. See, for example, R. E. LaMarche-C. J. May, Jr. U.S. Pat. No. 3,673,355 issued June 27, 1972 and U.S. Pat. No. 3,823,275 issued July 9, 1974. As mentioned in the LaMarche-May U.S. Pat. No. 3,673,355, the digital attenuator circuitry may include a source of low-level noise to be extended to the subscriber while his receive path is disabled. Alternatively, W. L. Montgomery U.S. Pat. No. 3,699,273 issued Oct. 17, 1972 discloses an arrangement which blocks (or zeroes) all incoming code word bits except the least significant bits, which are allowed to pass through the attenuator circuitry unaltered, thereby providing a low-level quasi-random signal on the path to the subscriber during interruption of the receive path.

Limitations encountered with the Montgomery arrangement relate principally to the difficulty in achieving satisfactory signal levels to offset the noise drop during receive path interruption, particularly where the normally received noise level is of significant magnitude. Obviously the signal level can be increased by allowing additional bits of the incoming code words to pass unaltered through the attenuator circuitry. However, as two or more incoming bits are passed to the subscriber, the intelligibility of the incoming signal tends to be distinguishable and therefore objectionable. Of course, an independent noise source can be employed to achieve any desired signal level during receive path interruption, but with attendant disadvantages related to cost and complexity.

SUMMARY OF THE INVENTION

A primary object of the present invention is to offset the effects of noise fluctuations in transmission systems caused by the operation of digital echo suppressors or other apparatus.

A more specific object is to provide a simple and inexpensive digital echo suppressor noise insertion arrangement which alleviates the limitations and disadvantages of known arrangements.

In an illustrative embodiment of a transmission system according to my invention, depicted in a digital echo suppressor, the need for a separate noise source is eliminated by an arrangement which modifies the existing incoming (echo) code word bits to provide a random noise signal of the desired amplitude. The random noise signal is then extended to the subscriber during echo suppression. In the specific illustrative embodiment, the echo suppression circuitry includes a plurality of bit transmission gates connected in the receive path of the subscriber. Digitally encoded speech and other signals appearing on the receive path are normally extended unaltered through the transmission gates to the subscriber. However, during echo suppression the receive path transmission gates are disabled so as to block the incoming coded echo signals. At the same time, individual bits of the blocked echo signal are modified in a predetermined manner and extended to the subscriber to effectively simulate the transmission facility noise normally heard.

According to one aspect of the invention, assuming the use of an illustrative companded sign magnitude code, the sign bit of each echo code word is replaced by a random value bit such as the least significant bit of the code word, the least and next-to-least significant bits are interchanged and the remaining bits are effectively zeroed. The thus modified echo code words advantageously provide an unintelligible noise signal of appropriate amplitude to offset the typical drop in received noise level during echo suppression.

BRIEF DESCRIPTION OF THE DRAWING

The above and other objects and features of the invention may be fully apprehended from the following detailed description and the accompanying drawing in which.

DETAILED DESCRIPTION

Figure 1:
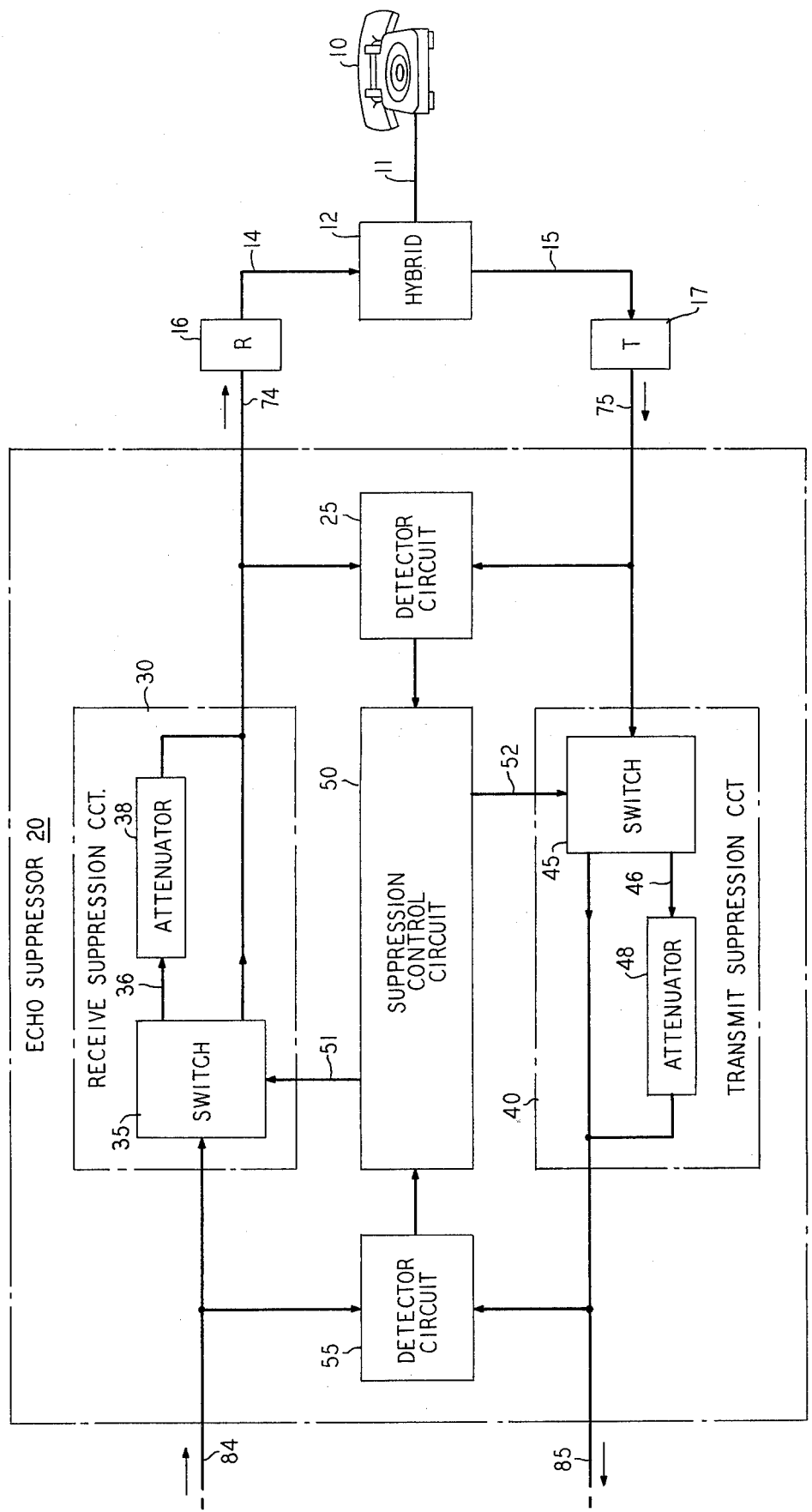
FIG. 1 is a functional block diagram of an illustrative echo suppressor embodiment in accordance with the invention.

The block diagram in FIG. 1 depicts a typical transmission system in which an echo suppressor in accordance with the invention may be employed—namely, a two-way transmission system including a four-wire transmission facility and a two-wire transmission facility. Subscriber terminal 10, referred to herein as the near-end subscriber, is connected to the four-wire facility by two-wire, two-way circuit 11 and hybrid network or its equivalent 12. Extending from hybrid 12 are a pair of one-way transmission paths 14 and 15 associated respectively with receiver 16 and transmitter 17.

The four-wire transmission facility, depicted as a pair of two-wire paths, may comprise a pair of carrier channels, a pair of one-way radio paths or other one-way transmission channels for interconnecting subscriber terminals. Digital transmission is assumed over the four-wire facility and thus receiver 16 and transmitter 17 function in the usual fashion for converting between analog signals on the two-wire facility and corresponding digital code words on the four-wire facility. Furthermore, as is well known, receiver 16 and transmitter 17 may comprise parallel-to-serial and serial-to-parallel conversion circuitry, if desired for a particular facility, or such conversion circuitry may be included within echo suppressor 20. Similar circuitry may be included also in incoming receive and outgoing transmit paths 84 and 85.

Echo suppressor 20, connected in circuit with the four-wire transmission facility, is commonly referred to as a full echo suppressor since it operates to suppress echoes in both directions over the facility. A variety of echo suppressor arrangements for providing echo suppression as depicted in the block diagram of FIG. 1 are well known and described in detail in the art. See, for example, the above-identified LaMarche-May patents. Consequently, the description of these arrangements herein will be limited to that believed necessary for a complete understanding of the present invention.

Echo suppressor 20 comprises detector circuit 25, suppression control circuit 50 and transmit suppression circuit 40 for interrupting or disabling speech transmission over outgoing path 85 when signals from the far end appear on incoming path 84, thereby preventing echoes due to incoming signals on path 84 from returning to the far-end subscriber terminal over path 85. Echo suppressor 20 similarly includes detector circuit 55, suppression control circuit 50 and receive suppression circuit 30 for interrupting or disabling speech transmission on incoming path 84 when signals from near-end subscriber 10 appear on outgoing path 85, thereby preventing echoes due to signals on path 85 from returning to the near-end subscriber 10 over path 84.

In common with prior art echo suppressors, detector circuits 25 and 55 examine the incoming signals and outgoing signals to determine when near-end subscriber 10 is transmitting, when the far-end subscriber is transmitting and when both subscribers are transmitting. Based on this determination, detector circuits 25 and 55 direct corresponding indications to suppression control circuit 50 which takes appropriate action. If the far-end subscriber is determined to be transmitting and near-end subscriber 10 is not, for example, control circuit 50 disables speech transmission over outgoing path 85 by extending a suppression enabling signal over path 52 to transmit suppression circuit 40.

In the absence of suppression, outgoing signals on paths 15 and 75 are extended through switch 45 directly to outgoing 85. Responsive to the suppression enabling signal on path 52, however, switch 45 operates to extend the signals on path 75 instead over path 46 through attenuator 48 to outgoing path 85. Attenuator 48 effectively disables speech transmission over outgoing path 85 by digitally attenuating signals on path 75 to a level below the threshold of hearing.

In a similar manner, if near-end subscriber 10 is determined to be transmitting and the far-end subscriber is not, control circuit 50 disables speech transmission over incoming path 84 by extending a suppression enabling signal over path 51 to receive suppression circuit 30. Responsive to the suppression enabling signal on path 51, switch 35 operates to interrupt the direct connection between paths 84 and 74, instead extending signals on incoming path 84 over path 36 through attenuator 38 to path 74.

The four-wire transmission facility typically contributes significantly to the overall background noise heard by near-end subscriber 10. Thus, in prior arrangements, when echo suppressor 20 operates to disable incoming receive path 84 via suppression circuit 30, a significant drop occurs in the noise level received by near-end subscriber 10, perhaps sufficient to cause subscriber 10 to believe that the transmission facility has failed or been disconnected. In accordance with the invention, however, audible transmission over path 74 to subscriber 10 is not totally disabled during operation of suppression circuit 30. Rather, incoming echo signals on path 84 are suppressed by modifying the echo signals to provide an attenuated noise signal over path 74 to subscriber 10. Thus the broad functions of switch 35 and attenuator 38 in prior arrangements are provided in the present invention by circuitry which operates during echo suppression to modify the incoming echo code words in a predetermined manner to generate a random noise signal. The noise signal, extended to path 74 in place of the incoming echo signals, is of sufficient magnitude to substantially offset the noise drop during echo suppression. Consequently, near-end subscriber 10 remains essentially unaware of the operation of echo suppressor 20.

Figures 2, 3:
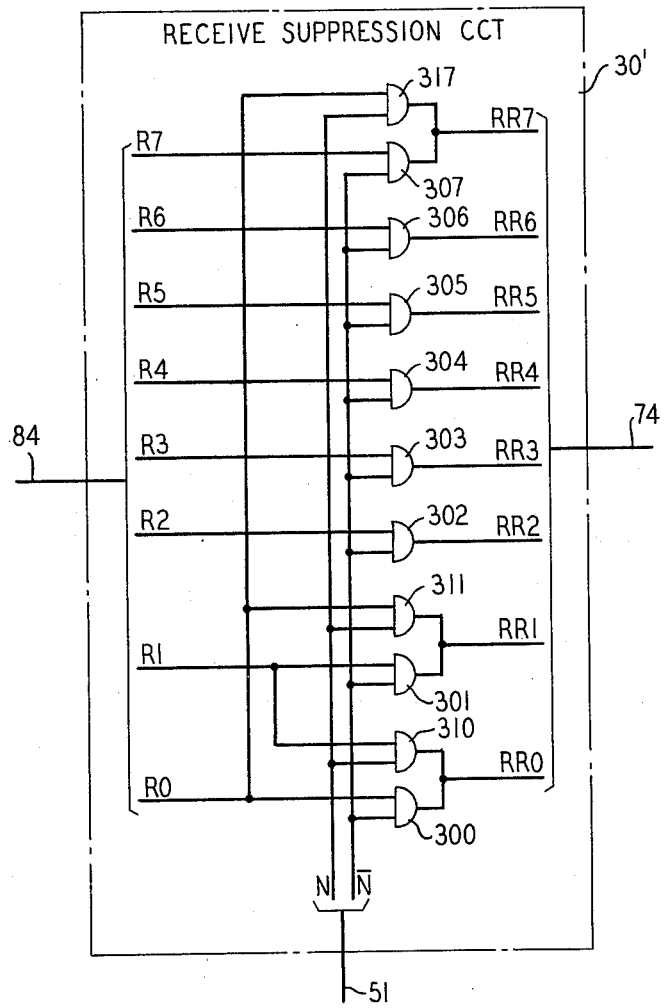
FIG. 2 shows the receive suppression circuit and noise insertion arrangement of FIG. 1 in greater detail.
FIG. 3 is a table depicting the modification of the echo code word bits effected by the illustrative embodiment of FIG. 2 during echo suppression.

A specific illustrative embodiment of a receive suppression circuit according to the principles of the invention is shown in detail in FIG. 2. It will be appreciated, of course, that a similar arrangement may be employed in the transmit suppression circuit to provide the broad functions of switch 45 and attenuator 48. For purposes of describing the illustrative embodiment, digitally encoded speech and echo signals on incoming path 84 are assumed to comprise code words each having eight bits R0–R7. One such code in common use is a companded sign magnitude code used in pulse code modulation speech transmission systems. Each eight-bit companded sign magnitude code word would include a sign bit R7, segment or chord bits R4–R6, and position or linear bits R0–R3. Sign bit R7 thus indicates the polarity of the encoded analog signal sample and bits R0–R6 indicate the magnitude thereof.

Bits R0–R7 on path 84 are extended to one input of respective gates 300–307 in receive suppression circuit 30'. The other input of each of gates 300–307 is connected in common via lead $\overline{N}$ over path 51 to control circuit 50. Gates 300–307 are enabled over lead $\overline{N}$ in the absence of a suppression enabling signal on path 51 to extend code word bits R0–R7 directly therethrough on leads RR0–RR7 to path 74.

Suppression circuit 30' also includes a second plurality of gates 310, 311 and 317, one input of each of which is connected in common via lead N over path 51 to control circuit 50. Least significant bit R0 on path 84 is extended to one input of gates 311 and 317, and next-to-least significant bit R1 is extended to one input of gate 310. Gates 310, 311 and 317 are enabled by a suppression enabling signal over path 51 on lead N to extend bit R0 through gates 311 and 317 and to extend bit R1 through gate 310 over leads RR1, RR7 and RR0, respectively, to path 74.

Thus in the illustrative embodiment, as depicted further in the table of FIG. 3, the sign bit R7 of each incoming echo code word on path 84 is replaced during echo suppression by the least significant bit R0 of the echo code word, the least and next-to-least significant bits R0 and R1 are interchanged and the remaining bits are effectively zeroed. The thus modified echo code words advantageously provide an unintelligible noise signal on path 74 of appropriate amplitude to offset the typical drop in received noise level during echo suppression.

What has been described hereinabove is a specific illustrative embodiment of the principles of the present invention. For example, in certain applications the least significant bit of the incoming code words may tend to not have a random value. Therefore, to insure an unintelligible noise signal, it may be desirable to replace the sign bit with another bit of more random value, such as the next-to-least significant bit or a parity bit. Furthermore, it will be readily appreciated that although in the illustrative embodiment only the sign bit and two least significant bits of the echo code words are modified and extended to path 74 to provide noise insertion, additional or alternative echo code word bits could be modified for this purpose. Thus, although the particular three-bit noise code words of the illustrative embodiment have been found to provide a sufficient noise level for typical applications, noise code words having a fewer or greater number of bits can be employed to provide a different noise level if desired. It will be further apparent that the number of code word bits employed for noise can be varied, either manually or automatically, according to variations in the normal received noise level. Numerous and varied other arrangements may be derived by those skilled in the art without departing from the spirit and scope of the invention.

What is claimed is:

1. In a digital arrangement for suppressing echoes in a two-way communications system having incoming and outgoing paths which are normally subject to the presence of transmission noise; means operative during suppression of incoming communications signals for inserting noise in said incoming path, said incoming communications signals comprising encoded multibit representations; and said noise insertion means comprising means for altering all of the bits of each said encoded representation in a predetermined manner to simulate said transmission noise normally present on said incoming path, and means for extending said altered representations to said incoming path.

2. In a digital arrangement for suppressing echoes in a two-way communications system having incoming and outgoing paths which are normally subject to the presence of transmission noise; means operative during suppression of incoming communications signals for inserting noise in said incoming path, said incoming communications signals comprising encoded multibit representations; and said noise insertion means comprising means for altering the bits of each said encoded representation in a predetermined manner to simulate said transmission noise normally present on said incoming path, and means for extending said altered representations to said incoming path; said altering means comprising means for replacing certain bits of each said encoded representation with predetermined other bits of said each encoded representation.

3. An arrangement according to claim 2 wherein said altering means comprises means for effectively zeroing bits of said encoded representations other than said certain bits.

4. An arrangement according to claim 3 wherein the number of said certain bits is determined in accordance with the level of said transmission noise normally present on said incoming path.

5. In a digital arrangement for suppressing echoes in a two-way communications system having incoming and outgoing paths which are normally subject to the presence of transmission noise; means operative during suppression of incoming communications signals for inserting noise in said incoming path, said incoming communications signals comprising companded sign magnitude encoded multibit representations; and said noise insertion means comprising means for altering the bits of each said encoded representation in a predetermined manner to simulate said transmission noise normally present on said incoming path, and means for extending said altered representations to said incoming path; and wherein said altering means comprises means for replacing the sign bit of each said encoded respresentation with another bit having a more random value than said sign bit.

6. An arrangement according to claim 5 wherein said altering means further comprises means for interchanging the least significant bit and the next-to-least significant bit of each said encoded representation.

7. An arrangement according to claim 6 wherein said altering means further comprises means for effectively zeroing the remaining bits of each said encoded representation.

8. An arrangement according to claim 7 wherein said another bit comprises said least significant bit of each said encoded representation.

9. An arrangement according to claim 5 wherein said another bit comprises a parity bit of each said encoded representation.

10. A digital noise inserting arrangement for simulating transmission noise normally present on a communications signal transmission path comprising, means for receiving digitally encoded communications signals intended for transmission over said path, means for modifying said encoded communications signals by replacing certain individual digits of said encoded signals with predetermined other individual digits of said encoded signals to generate said noise, and means operative for providing said noise to said transmission path.

11. A noise inserting arrangement according to claim 10 wherein said modifying means includes means for effectively zeroing all digits of said encoded signals other than said certain digits.

12. A noise inserting arrangement according to claim 11 wherein the number of said certain digits is determined in accordance with the desired level of said noise.

13. A noise inserting arrangement according to claim 11 wherein said modifying means comprises a plurality of gating circuits individually associated with respective ones of said certain digits, means for extending said predetermined other digits to said gating circuits, and means connecting the output of said gating circuits to said transmission path; and wherein said providing means comprises means operative for enabling said gating circuits.

14. A noise inserting arrangement according to claim 10 wherein said communications signals are encoded in a companded sign magnitude code, and wherein said modifying means comprises means for replacing the sign bit of each of said encoded signals with a parity bit thereof and for replacing the remaining bits of each of said encoded signals with predetermined bits.

* * * * *